United States Patent [19]

Hughey, Jr.

[11] 4,056,888
[45] Nov. 8, 1977

[54] DEVICE FOR MEASURING THE PITCH OF PROPELLER BLADES AND THE LIKE

[76] Inventor: Edward W. Hughey, Jr., 5827 Downing Drive, Indianapolis, Ind. 46208

[21] Appl. No.: 698,357

[22] Filed: June 22, 1976

[51] Int. Cl.² .......................... G01B 3/56; G01B 5/24
[52] U.S. Cl. .................................................. 33/174 C
[58] Field of Search ..................................... 33/174 C

[56] References Cited

U.S. PATENT DOCUMENTS

| 1,021,797 | 4/1912 | Rice | 33/174 C |
| 1,696,525 | 12/1928 | Coolidge | 33/174 C |
| 2,717,453 | 9/1955 | Wildt | 33/174 C |
| 2,941,301 | 6/1960 | Wright | 33/174 C |

FOREIGN PATENT DOCUMENTS

| 866,386 | 2/1953 | Germany | 33/174 C |
| 22,661 | 2/1962 | Germany | 33/174 C |
| 29,049 | 9/1918 | Norway | 33/174 C |

Primary Examiner—Richard E. Aegerter
Assistant Examiner—Richard R. Stearns
Attorney, Agent, or Firm—Woodard, Weikart, Emhardt & Naughton

[57] ABSTRACT

A device for measuring the pitch of propeller blades and the like is disclosed herein which comprises a shaft on which the bladed item is mounted. An arm is rotatably and slidably received upon the shaft and has a pin which rides along the blade surface to be measured. The pin is moved along the blade surface by rotating and sliding the arm along the shaft. The pitch is determined from measurements of the rotational and axial movement of the arm.

12 Claims, 4 Drawing Figures

U.S. Patent  Nov. 8, 1977  Sheet 1 of 2  4,056,888

DEVICE FOR MEASURING THE PITCH OF PROPELLER BLADES AND THE LIKE

BACKGROUND OF THE INVENTION

1. Field of the Invention

This invention relates to the field of measuring devices for determining the pitch of propeller blades and the like.

2. Description of the Prior Art

Several types of devices utilize bladed items such as propellers and fans. In general, the bladed items have two or more blades which extend radially from a central hub. A shaft normally is either received within an aperture defined by the hub or is made an integral part of the hub. The bladed item is rotated about the rotational axis defined by the longitudinal axis of the shaft.

The performance of the bladed item depends on many variables including the size, shape and pitch of the blades. The pitch refers to the angle between a blade and the rotational axis. A station for a blade is an area of the blade located a given distance from the rotational axis, which is also referred to herein as the base station line. The pitch of a blade may vary for the different blade stations. Bladed items must be carefully balanced with respect to the blade variables, and it is therefore desirable to have a means for measuring these blade variables.

Several devices exist for determining the pitch of blades. One such device is disclosed in U.S. Pat. No. 3,380,170, issued to Read on Apr. 30, 1968. The Read device includes a shaft on which a propeller or the like is received. A rectangular arm extends radially from the shaft and supports a second arm which extends downwardly and parallel to the shaft. A generally triangular pointer is pivotally attached to the second arm and is oriented in a plane normal to the first arm. When the two base points are positioned against the blade surface, the apex of the pointer indicates the degree of pitch on a protractor mounted appropriately on the second arm. The Read device is suitable for proximately determining the pitch of a blade for a given station. The Read device, however, does not permit measurement of the pitch of only a sector of the blade, a sector being defined as a portion less than a full station.

In U.S. Pat. No. 1,021,797, issued to Rice on Apr. 2, 1912, there is disclosed another pitch measuring device. The Rice device includes an arm which rotates about a pivot affixed to the propeller hub. The arm is supported away from the hub by an arcuate bridge member which includes a protractor scale. Slidingly received on the arm is a casing which supports a screw threaded measuring finger. To measure the pitch of a blade, the measuring finger is positioned against the blade at one end of the station or sector. The finger is then positioned against the blade at the other end of the station or sector by rotating the arm and the screw-threaded finger as required. Rotation of the finger results in displacement of the finger along a line parallel to the rotational axis of the arm. The rotation of the arm is determined by reference to the scale on the supporting bridge member. The finger casing is provided with a geared dial which reflects the axial displacement of the finger resulting from its rotation. The pitch may then be calculated from the rotational movement of the arm and the axial movement of the finger according to the known formula that pitch is equal to the axial movement multiplied by 360° and divided by the rotational movement. The Rice device thus permits measurement of the pitch for any sector of the blade. The Rice device is, however, fairly cumbersome and does require relatively precise and expensive production of the measuring finger and associated, geared dial. A similar device using a movable measuring finger received by an arm attached at a fixed location on a shaft is disclosed in U.S. Pat. No. 2,717,453, issued to Wildt on Sept. 13, 1955.

The existing pitch measuring devices are suitable for particular applications. There are limitations, however, on the usefulness of these various devices. As previously noted, for example, not all existing devices are capable of measuring the pitch of each blade sector. Those capable of measuring the various sectors generally incorporate complicated or precision elements which add to the expense and potential inaccuracy of the devices. There is therefore a need for a pitch measuring device which is simple and inexpensive in construction and which may be used to easily and accurately determine the pitch of any blade sector. The measuring device also is most preferably of a design which may be readily adapted for use with the various sizes and shapes of bladed items.

SUMMARY OF THE INVENTION

A device for measuring the pitch of propeller blades and the like is disclosed herein which comprises a base, shaft means connected to the base for mounting a propeller coaxial with a base station line, an arm mounted upon the shaft means, the arm being rotatable in a plane essentially normal to the base station line, the arm further being movable parallel to the base station line, pin means attached to the arm for engaging the surface of a propeller mounted upon the shaft means, linear measurement means for measuring the movement of the arm parallel to the base station line, and rotational measurement means for measuring the rotation of the arm in a plane essentially normal to the base station line.

An object of the present invention is to provide a simple, durable and inexpensive device for determining the pitch of a bladed item.

It is another object of the present invention to provide a measuring device for readily determining the pitch of any sector on a bladed item.

A further object of the present invention is to provide a device for quick and accurate measurement of pitch.

Another object of the present invention is to provide a pitch measuring device of a design which is adaptable to be used with a large variety of types and sizes of bladed items.

A further object of the present invention is to provide a measurement device which meets the aforementioned objects and which is portable, lightweight and easily operated.

Further objects and advantages of the present invention will become apparent from the following figures and description of the preferred embodiment.

DESCRIPTION OF THE PREFERRED EMBODIMENT

Figure 1:
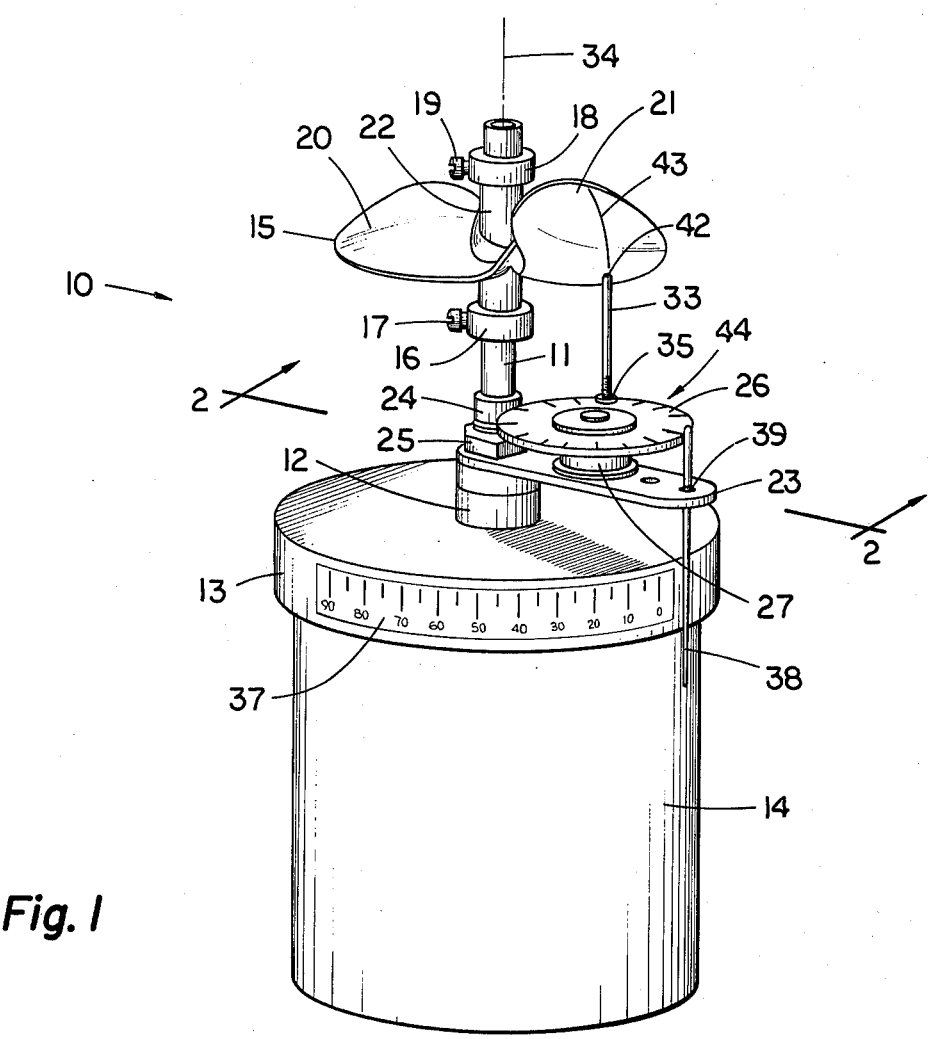
FIG. 1 is a perspective view of the pitch measuring device of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
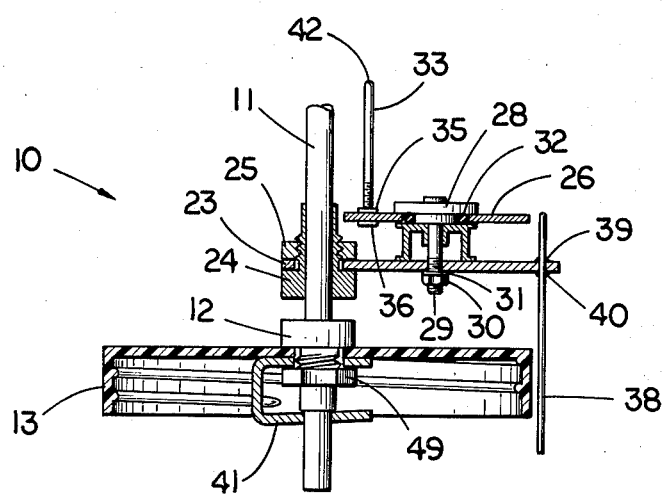
FIG. 2 is an enlarged, partial cross-section view of the device of FIG. 1, taken along line 2—2 in the direction of the arrows.

Referring now to the figures, there is shown a pitch measuring device 10 according to the present invention. Device 10 includes a shaft 11 slidingly and rotatably received within an aperture defined by support member 12 (FIG. 2). Support member 12 is attached to lid 13 which is threadingly received upon container 14. A frictional member 41 is provided with a pair of apertures within which shaft 11 is received. Nut 49 holds lid 13 and member 41 in frictional engagement with support member 12. Support member 12 defines a central aperture in which shaft 11 is received. Shaft 11 is slidable and rotatable within the apertures defined by support member 12 and member 41. Member 41 does frictionally engage shaft 11, however, to maintain shaft 11 in a selected position.

Container 14 is made large enough to provide a stable base for device 10. The other elements of device 10 are also easily dismantled and may be conveniently stored in container 14 when not in use. Incorporation of lid 13 and container 14, however, is not a necessary part of the present invention. Container 14 does facilitate storage of the other elements of device 10 when the device is of a relatively small size, as when intended for use with model boat or airplane propellers. Device 10 may, however, be sized to be used in conjunction with larger bladed items and the base structure may be modified as required. The present invention may even be used under circumstances in which the base comprises the propeller or other bladed item itself or the structure upon which the bladed item is mounted.

The top portion of shaft 11 is adapted to receive a propeller 15 or similar item. Propeller 15 includes blades 20 and 21 extending radially from central hub 22. Shaft 11 may, for example, be provided with external threads to receive a propeller having complementary, internal threads. Alternatively, shaft 11 includes a collar 16 which is attached to shaft 11 by set screw 17. Collar 16 may be selectively positioned along shaft 11 as desired. A second collar 18 is secured by set screw 19 along shaft 11 to frictionally hold propeller 15 between collars 18 and 16. Propeller 15 rotates about a central rotational axis 34 which lies colinear with the longitudinal axis of shaft 11 when supported thereon.

Attached to shaft 11 is an arm 23 which extends radially therefrom. Arm 23 is received upon support member 24, which may be identical to support member 12. Support member 24 defines a central, cylindrical passageway which fits closely about shaft 11. Nut 25 is threadingly received by support member 24 and secures arm 23 against support member 24. The close fit of support member 24 upon shaft 11 provides a stable support for arm 23 with a minimal amount of play in arm 23.

Disc 26 is rotatably mounted upon arm 23. Spacer 27 rests upon arm 23 and supports disc 26. Washer 28 has a shoulder portion which extends through a central aperture defined by disc 26 and rests against spacer 27. Bolt 29 extends through central apertures in washer 28, disc 26 and spacer 27 and threadingly receives nut 30. Nut 30 is threaded upon bolt 29 against washer 31 to hold disc 26 and the associated elements upon arm 23. O-ring 32 is received between the shoulder portion of washer 28 and disc 26 to frictionally engage disc 26.

The particular supporting structure for disc 26 as described herein is not necessary to the present invention. The purpose is to rotatably support disc 26 upon arm 23 and to provide means for maintaining disc 26 at a selected rotational position. Disc 26 could also be modified as by making it a different shape such as, for example, an elongated arm. The depicted combination of elements is preferred, however, since it represents a simple construction which functions as required.

A straight pin 33 is attached to disc 26 and preferably extends parallel to axis 34. It may be desirable or necessary, however, to orient or shape pin 33 differently to accommodate particular bladed items. Pin 33 is externally threaded and is preferably attached to disc 26 by nuts 35 and 36, which are tightened against opposite sides of disc 26. The position of pin 33 is thereby adjustable with respect to disc 26, and therefore arm 23. The position of pin 33 on disc 26 and the diameter and position along arm 23 of disc 26 may be varied as desired. Pin 33 is preferably located near the edge of disc 26 and disc 26 is preferably located so that its edge lies near shaft 11. This permits the maximum range of blade stations or sectors thereof to be measured by the device 10.

A protractor scale 37 is located on lid 13. A pointer 38 is attached to arm 23 and is positioned to indicate the relative rotational position of arm 23 along scale 37. Pointer 38 may be connected to arm 23 in any known manner as by insertion through an aperture in arm 23 and attachment therein by soldering or staking as indicated at 39 and 40. The position and structure of pointer 38 and scale 37 may be modified as desired or necessary. Scale 37 could, for example, be located on the top of lid 13. The depicted position of scale 37 is particularly suitable when device 10 is used while sitting at a bench or table since the scale 37 is then more easily read. Also, by making the pointer sufficiently long, the sliding of arm 23 along shaft 11 will not displace pointer 38 from scale 37 so far as to prevent reading of the rotational position. This could not be as easily accomplished if scale 37 were located differently. In addition, it may be desirable to know the distance between pin 33 and axis or base station line 34. Pointer 38 may then extend above arm 23 (FIG. 1) and cooperate with scale 44 on disc 26 to determine this distance.

The pitch measuring device 10, as described, is fully adjustable and operable to determine the pitch of virtually any station or sector of a blade. To measure the pitch of a particular blade sector, the tip 42 of pin 33 is positioned against the blade at one end of the sector. The arm 23 is then rotated about and slid along shaft 11 until tip 42 is positioned at the other end of the sector. The rotational and axial movement of arm 23 are then determined and the pitch may be calculated.

Figure 3:
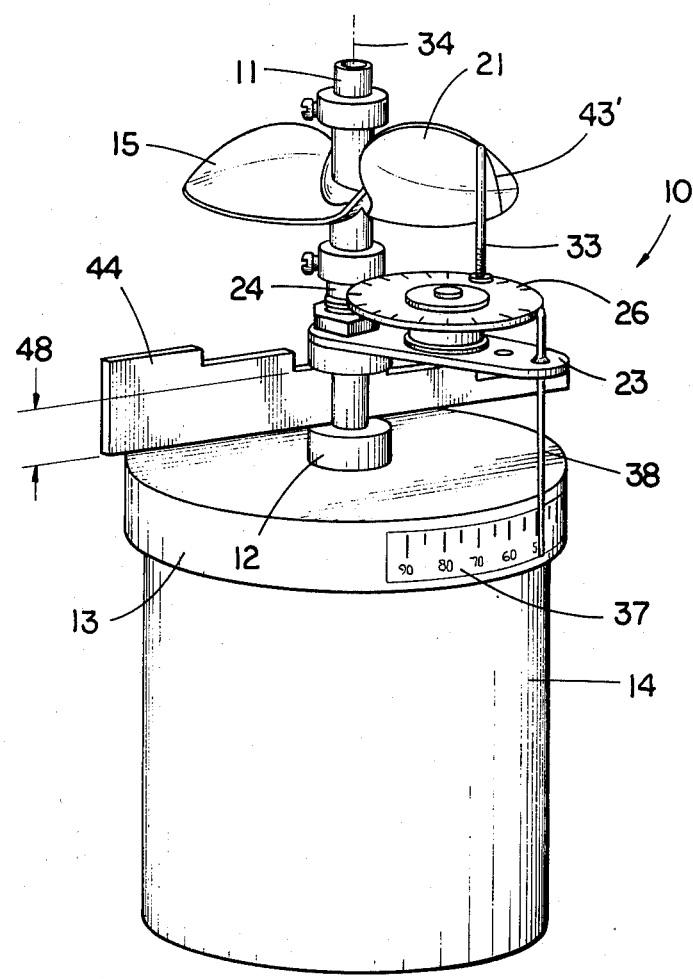
FIG. 3 is a perspective view of the pitch measuring device of the present invention with the arm positioned to measure the pitch of a station on the blade.

The procedure for determining pitch of a blade station or sector is exemplified in FIG. 3. Tip 42 is positioned against one end of blade station 43' in the manner described relative station 43 in FIG. 1. Disc 26 is rotated relative arm 23 to locate pin 33 the appropriate distance from axis 34. The position of propeller 15 and shaft 11 are adjusted so that support member 24 rests adjacent support member 12 when tip 42 is positioned at the end of station 43'. Arm 23 and shaft 11 are then rotated so that pointer 38 reads zero or any other desired reference point on scale 37. Arm 23 is then rotated about and slid along shaft 11 until tip 42 is positioned at the other end of station 43' (FIG. 3). The movement of arm 23 corresponds to the movement of tip 42 of pin 33. The rotational movement of arm 23 is determined by reference to the location of pointer 38 along scale 37. The axial movement of arm 23 is determined in a known manner and the pitch is computed for station 43'.

Figure 4:
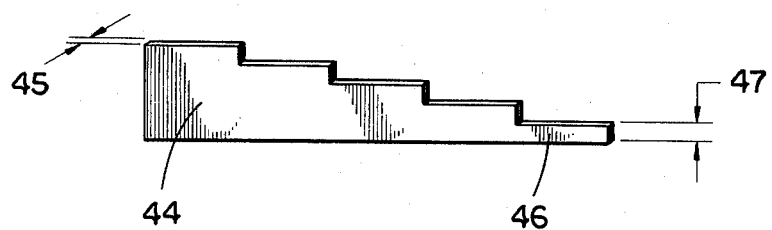
FIG. 4 is a perspective view of a step gauge which may be used with the present invention.

The axial movement of arm 23 may be determined by several methods. Graduations may, for example, be provided along shaft 11 for this purpose. In FIG. 4 there is shown a step gauge 44 which is particularly accurate and useful with the pitch measuring device of the present invention. Step gauge 44 has a thickness 45 of a convenient dimension such as one-sixteenth inch. The steps of gauge 44 also have convenient height dimensions. Step 46, for example, could have a height 47 of one-eighth inch, with the height of successive steps likewise being in fractional or dimensional progressions. To use step gauge 44, the tip 42 is positioned (FIG. 1) at the lower end of the station and pointer 38 is zeroed as previously described. Arm 23 is then rotated about and slid along shaft 11, as previously described, to position tip 42 at the other end of the station. Step gauge 44 is then positioned so that the step having a height which most closely corresponds with the axial movement of arm 23 is inserted between support members 24 and 12 (FIG. 3). Tip 42 is then positioned against the blade, such as 21, and the relative rotational position of arm 23 is read. The pitch is then calculated from the known height 48 of the step and the corresponding rotational movement.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. Certain modifications of the described device would be obvious in particular applications. Some bladed items have integral shafts which would preclude mounting the item as particularly described herein. The support shaft could then be modified, for example, by providing for the attachment of it to the integral shaft or hub, or the arm 23 could be directly mounted upon the integral shaft.

Known types of modifications of arm 23 and other elements could be required to minimize play therein when the device is used for large or unusually shaped bladed items.

Device 10 could also be inverted or otherwise oriented as desirable for particular applications. These and other natural and obvious modifications within the scope of the present invention are intended to be covered by the claims.

What is claimed is:

1. A device for measuring the pitch of propeller blades and the like which comprises:

a base;
   shaft means connected to said base for mounting a propeller coaxial with a base station line;
   an arm mounted upon said shaft means, said arm being rotatable in a plane essentially normal to the base station line, said arm further being movable parallel to the base station line;
   pin means attached to said arm for engaging the surface of a propeller mounted upon said shaft means;
   linear measurement means for measuring the movement of said arm parallel to the base station line; and
   rotational measurement means for measuring the rotation of said arm in a plane essentially normal to the base station line.

2. The device of claim 1 in which said pin means comprises an elongated pin positioned generally parallel to the base station line, said pin means further comprising adjustment means for adjusting the distance between said pin and the base station line.

3. The device of claim 2 in which said adjustment means comprises a pin support rotatably attached to said arm, said pin support being rotatable in a plane essentially normal to the base station line, said pin being attached to said pin support.

4. The device of claim 3 in which said adjustment means further comprises calibration means for permitting measurement of the radial distance between said pin and the base station line.

5. The device of claim 3 in which said rotational measurement means comprises a degree scale upon said base and an elongated pointer attached to said arm.

6. The device of claim 1 in which said shaft means includes a shaft attached to said base, said shaft means further comrpising support means for mounting said bladed item upon said shaft, said bladed item defining a central aperture in which said shaft is received, said support means mounting said bladed item in such a manner that its rotational axis is colinear with the base station line.

7. The device of claim 6 which includes positioning means for varying the distance between said support means for said bladed item and said base, said positioning means including an aperture defined by said base, said shaft being slidingly received within said aperture.

8. The device of claim 6 wherein said support means includes positioning means for varying the distance between said support means for said bladed item and said base, said positioning means including a collar mounted upon said shaft adjacent said bladed item, said collar including a set screw extending therethrough and engaging said shaft.

9. The device of claim 6 which includes positioning means for varying the rotational relationship between said shaft and said base.

10. The device of claim 9 in which said positioning means includes an aperture defined by said base, said shaft being rotatably received within said aperture.

11. The device of claim 10 in which said base comprises a container and a lid releasably attached to said container, said aperture being defined by said lid.

12. The device of claim 11 in which said container is cylindrical and is externally threaded about an open top, said lid being generally circular with a cylindrical internally threaded ledge, said lid being threadingly received about the open top of said container, said degree scale being located upon the cylindrical ledge of said lid.

* * * * *